United States Patent [19]

Lindner et al.

[11] 3,724,116
[45] Apr. 3, 1973

[54] FISH HOOK FOR USE WITH A PLASTIC WORM

[76] Inventors: Ronald J. Lindner; Allen J. Lindner, both of Route 6; Nicholas S. Adams, Route 7, all of Brainerd, Minn. 56401

[22] Filed: Mar. 4, 1971

[21] Appl. No.: 120,946

[52] U.S. Cl. ............. 43/42.24, 43/44.8, 43/44.83
[51] Int. Cl. ............................................. A01k 85/00
[58] Field of Search......43/42.24, 44.83, 43.16, 44.2, 43/44.8

[56] References Cited

UNITED STATES PATENTS

| | | | |
|---|---|---|---|
| 2,926,454 | 3/1960 | Gottman | 43/44.83 |
| 895,493 | 8/1908 | O'Brien | 43/44.83 |
| 3,429,066 | 2/1969 | McClellan | 43/42.24 |
| 3,023,536 | 3/1962 | Williams | 43/43.2 |

Primary Examiner—Hugh R. Chamblee
Assistant Examiner—Daniel J. Leach
Attorney—Clarence A. O'Brien and Harvey B. Jacobson

[57] ABSTRACT

A weedless plastic worm rig characterized by a leader, a conical slip sinker slidable on the leader, a plastic worm and a long shank sproat hook. The trailing end of the shank terminates in a relatively short pointed barb. The leading end is doubled upon itself to form a line attaching eye and embodies a J-shaped terminal end portion which is wholly embedded and anchored in the head of the worm to prevent the worm from sliding down the shank. The short pointed barb is embedded in the worm to assume an upward bite-responsive locale immediately under the surface of the skin of the worm.

6 Claims, 6 Drawing Figures

PATENTED APR 3 1973 3,724,116
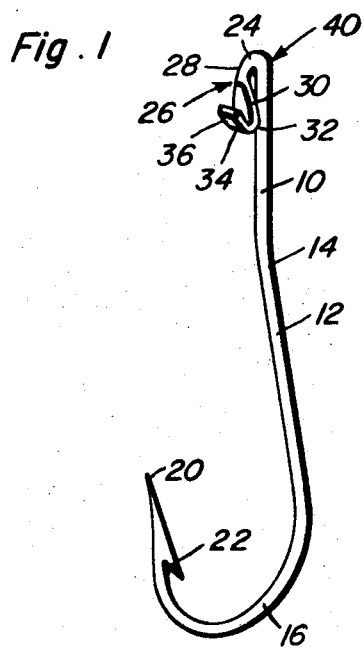
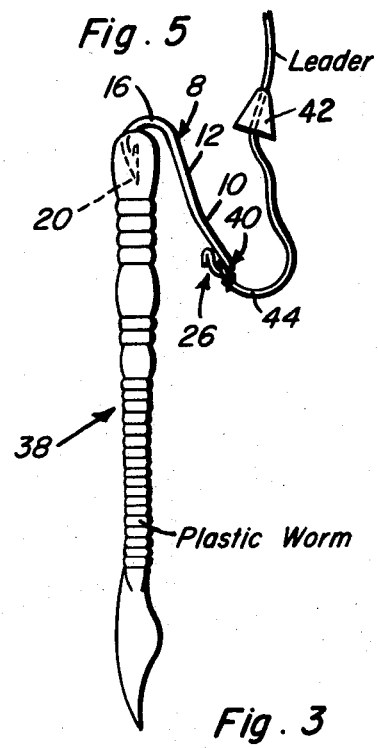
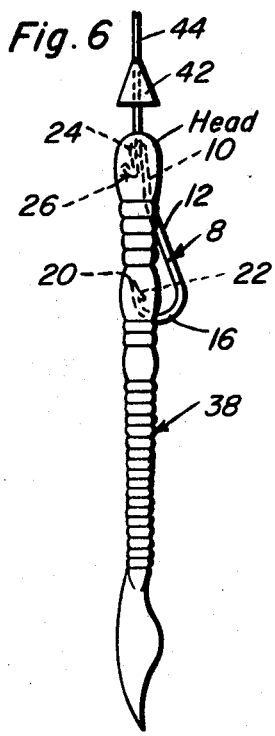
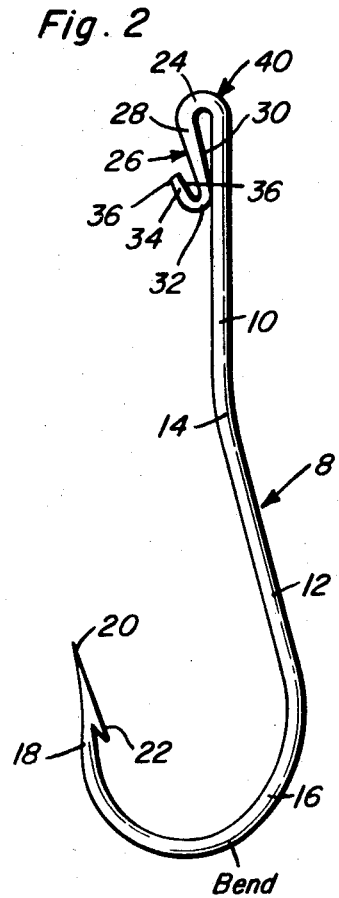
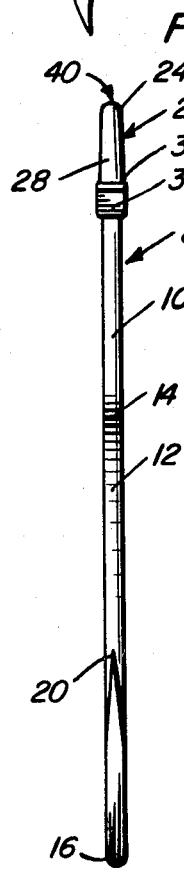
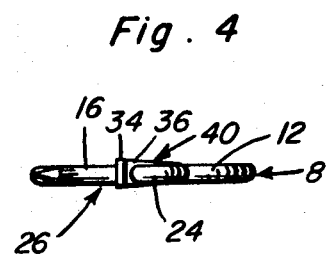
Ronald J. Lindner
Allen J. Lindner
Nicholas S. Adams
INVENTORS
BY Clarence A. O'Brien
and Harvey B. Jacobson
Attorneys

FISH HOOK FOR USE WITH A PLASTIC WORM

The present invention relates to rigging a plastic worm, commercially acceptable type, on a long shank sproat hook and utilizing a cone-shaped lead or an equivalent slip sinker as a weight on the leader and pertains, more particularly stated, to a hook which is not only suitably adapted for use in conjunction with the headed end of the worm but which features a self-contained leader-attaching and hook-locking eye which when properly embedded anchors and holds the hook in a given or set position relative to the complemental worm.

No two manufactures agree on hook designs or precise specifications such as have to do with the shank, eye, bend and the pointed barb. In fact, countless fish hooks of ever varying patterns and shapes have been designed in an effort to appeal to anglers in search of a type or style of hook preferred at the time of use. The hook herein disclosed has been devised and repeatedly found to meet with the preference of most anglers and their needs when employing an approved plastic worm on a long shank sproat hook with a modified rounding bend having a short point and corresponding short barb.

By way of introduction to the detailed description, it may well be pointed out that rigging a plastic worm on a long shank sproat hook and employing in conjunction therewith a cone-shaped or an equivalent slip sinker on the leader and attaching the leader to an embedded eye on a fish hook is not new, and, in fact, has been employed in many fishing areas for quite some time. The thus known method of rigging has certain advantages particularly in fishing heavy brush, stumps or obstacles particularly in that the long thin flexible plastic worm can work its way over and up through branches or trees, can crawl along the bottom over heavy rocks and at the bases of stumps and trees and because it is substantially weedless it reduces hang-ups to a minimum.

Briefly, the essence of the invention has to do with a fish hook which is unique in that it lends itself to feasible use in combination with a life-like plastic worm, a leader on the fishing line and a conical or equivalent slip sinker which is freely slidable on the fish line. The fact that the method of rigging, as above implied, is not new it will be evident at the outset that the disclosed invention pertains to a structurally and functionally novel fish hook, that is, an adaptation which is characterized by a long round shank having a trailing end joined with an arcuately curved bend terminating in a pointed barb and a leading end which is bent and doubled upon itself and is formed into a complemental substantially J-shaped or an equivalent terminal doubled-over shank portion. This end portion constitutes a line attaching eye, more particularly, an eye for the attachment of a leader which carries the slip sinker, also an eye which is adapted to be wholly embedded and locked in an anchored position in the head or nose of the worm to prevent the worm from sliding down the shank. The eye not only provides for attaching the hook to an end of the leader or fishing line but holds the worm in its given position and obviates the objectionable practice of piercing the head of the worm with a toothpick or a piece of wire in an effort to thus anchor and lock the usual ring-like eye of the hook to the worm.

Anglers and fishermen in this field of endeavor are conversant with the fact that slip rigs are placed on the hook and then a toothpick is run through the eye and the ends are clipped off. In some cases instead of using a toothpick, a piece of wire is passed through diametrically opposite sides of the head of the plastic worm and through the eye in a manner to prevent the worm from sliding down the shank of the hook every time an obstruction is hit or when a small pan fish yanks on the tail of the worm. Undesirable slippage can be frustrating to the angler when in a heavy school of bass. In addition, no angler likes to replace toothpicks when he can be busied catching fish. It follows that an object of the present invention is to hold the worm securely in place without the need of any additional retainers such as toothpicks, wires and the like.

As will be hereinafter more fully appreciated when the hook is properly located and set, it penetrates the plastic quickly and drives the pointed barb into the jaws of the fish. It constitutes a simple relatively inexpensive and sure method of landing and catching large mouth bass.

With a view toward giving further background information in the instant matter it can be pointed out that if the barb is too long it takes longer to penetrate the plastic and consequently the mouth of the fish. In carrying out the principles of the present invention, the curved bend of the hook is provided with a short barb and also a complemental short point.

It is significant to take into account that most hooks on the market were designed for purposes other than to be exclusively used for plastic worm fishing. An aspect of the concept pertains to the configuration of the disclosed hook in that when rigged the point is in an upward position immediately or directly under the surface of the skin of the plastic worm. On most hooks, this result does not occur and an angler must set the hook extremely hard and sometimes two or three times in order to assure himself that the hook has penetrated not only the plastic but has embedded itself in the mouth of the fish.

Most hooks have a straight shank and when rigged on a plastic worm the shank has to be adjusted and twisted before the point is set back in the worm so that the worm lays flat in the flat straight position and not undesirably twisted on the shank of the hook. It is reiterated that the highly important aspect of the disclosed hook is that it relieves the angler of the bothersome task of threading a toothpick through the plastic, through the usual eye and out through the plastic again and then having to trim the ends of the toothpick with a clipper or cutter. This has to be done sometimes because after fishing for a limited time the slip sinker and brush, branches and other obstacles in general tend to push the worm down the shank of the hook, making it practically unfishable. For proper hook setting the worm must slide back slightly, giving the worm a little slack to aid in driving the hook through the plastic and consequently into the mouth of the fish. Toothpicks and wire tend to keep the worm in a extremely rigid position and the angler is usually forced to set the hook extremely hard and often two or three times before he is sure that the barb has been properly driven into the jaw of the fish.

For additional background purposes and by evaluating the views of the drawing it will be evident that by designing the eye in the manner shown and herein set forth the problems which are normally encountered are solved. If follows that providing the desired doubled-over shank portion and fashioning the same into an elongate eye embodying a J-shaped terminal portion and properly shaping the component parts, hook anchoring and holding means is provided which, as experience has shown, well serves the purposes for which the unique hook was devised. To the ends desired, the hook-like bill portion of the J-shaped extension has flattened surfaces which provide the desired anchor and achieve the results desired with certainty and efficiency.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a fish hook constructed in accordance with the principles of the present invention illustrating the preferred embodiment of the coacting component parts;

FIG. 2 is an enlarged view in side elevation showing the improved hook;

FIG. 3 is a view observing FIG. 2 in a direction from left to right;

FIG. 4 is a top plan view, that is, a view looking down on either FIGS. 2 or 3, as the case may be;

FIG. 5 is a view showing the aforementioned life-like plastic worm and showing one of the steps, inserting the pointed barbed end of the hook in the nose or head with a view toward bringing the point of the hook out of one side and ultimately locating it in a position for final setting; and FIG. 6 is a view based on and similar to FIG. 5 and showing the aforementioned rig, that is, how the plastic worm is associated with the ready-to-use hook and how the leader is connected, the leader having the aforementioned slip sinker in position thereon.

With reference to the views of the drawing and particularly to FIGS. 1-4, the improved fish hook, is denoted by the numeral 8. The shank embodies a longitudinally straight upper half portion 10 and an oblique angled lower half portion 12 joined to the portion 10 by an appropriate bend 14. The usual curvate bend (at the bottom or trailing end in the views of the drawing) is denoted at 16 and the terminal portion thereof 18 is provided with a point 20 and an associated barb 22, these features being such that a short barb and a short point coordinate in achieving the penetration and set result shown in phantom lines in FIG. 6. The leading (leading when in use) end of the shank portion 10 is doubled upon itself as at 24 and embodies an extension which is here described as a J-shaped terminal end portion 26. This J-shaped portion embodies a tapering leg 28 having flattened surfaces 30 as shown in FIGS. 1 and 2 and also embodies a return bend or bight portion 32 which is joined with a bill portion 34 having flattened surfaces 36. This doubled-over shank and J-shaped end portion 26 conjointly define an anchoring hook which when embedded in the manner shown in FIG. 6 causes the overall hook to stay put relative to the worm 38. The worm is a plastic type which is popularly marketed and is shown here to best illustrate the manner of completing the rig for fishing results. There are basically three component parts: the positive locking hook 8, that is a hook with a self-locking end portion 40 (FIG. 2), a conical or equivalent slip sinker 42 on the nylon or equivalent leader 44 and the aforementioned plastic ready-to-use worm 38.

As shown in FIG. 5, the step there illustrated consists of passing the line or leader through the slip sinker in the manner shown and tying the end of the leader in the crotch portion of the doubled-over shank portion 24. It is necessary in following the proper procedural steps to push the point of the hook into the center of the worm about one-half inch. Then, the angler proceeds to bring the point of the hook out of the worm one-half in in back of the nose or head. It is advisable to pull the hook back through the worm until the special eye of the hook comes through the head of the worm. Then the worm is revolved on the hook until the point of the hook is pointed up. Next and as shown in FIG. 6, the angler proceeds to touch the point of the hook to the worm and holds the hook firmly and pushes the hook forward on the worm until the point is inserted into the worm about three-eighth inch. With the point started into the worm, he pulls back and down on the worm until the point of the hook lacks about one-eighth inch from coming through the skin or surface of the worm. This procedure adjoins the hook and worm and provides the rig desired for satisfactory fishing results.

By designing the eye 40 in the manner shown and described the problem of anchoring, embedding and locking the hook relative to the worm is solved. The J-shaped extension 26, the flattened surfaces 30 on the leg 28 and flattened surfaces on the hook-like bill portion achieve the locking result desired, and make clear the fact that the special purpose eye is the outstanding feature of the hook.

It is submitted that by considering the four views (FIGS. 1-4) showing the hook and by considering FIGS. 5 and 6 in conjunction with the description thereof the subject matter of this invention will be clear. Under the circumstances, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in conjunction with a life-like plastic worm, a fish line leader and a slip sinker shiftably mounted on a complemental end portion of said leader: an improved fish hook for rigging and retaining said plastic worm thereon comprising a long shank embodying a first longitudinally straight half-portion and a second complemental longitudinally straight half-portion disposed at an oblique angle relative to the longitudinal axis of said first half-portion, said shank being provided at a trailing end with a curvate bend, the terminal of said bend being provided with a relatively short barb and a corresponding short point which is embedded in said worm to assume an upward bite-responsive locale immediately under the surface of the oriented skin of said worm, the leading end of said shank being bent and doubled upon itself to form a complemental terminal end portion which is located alongside of and angled toward an adjacent side of said shank to provide a line attaching eye, said eye being wholly embedded and self-retained when in use in the head of the worm to prevent the worm from sliding down the shank, whereby said eye holds the worm in its given place.

2. The fish hook defined in and according to claim 1, and wherein said terminal end portion is J-shaped and embodies a leg having a free end provided with a return-bend defining a hook-like bill portion.

3. The fish hook defined in and according to claim 1 and wherein said terminal end portion is J-shaped and embodies a leg having a free end provided with a return-bend defining a hook-like bill portion, said leg being tapered and angled toward and abutting the coacting peripheral surface of said shank.

4. The fish hook defined in and according to claim 3, and wherein said return-bend and bill portion have flattened surfaces which assist in anchoring and securing the over-all eye in a given position.

5. A fish hook which lends itself to use in combination with a plastic worm, a fish line and a conical or an equivalent slip sinker which is freely slidable on the fish line, said fish hook comprising, a long round shank embodying a first longitudinally extending straight half-portion and a second longitudinally straight half-portion disposed at an angle oblique to the longitudinal axis of said first half-portion, said shank having a trailing end joined with an arcuately curved bend terminating in a relatively short pointed barb and a leading end which is bent and doubled upon itself to form a line attaching eye and is provided with a complemental J-shaped terminal end portion which is adapted to be wholly embedded and locked in an anchored position in the head of the worm to prevent the worm from sliding down said shank, whereby said eye provides for attaching the fish hook to an end of the fishing line and holds the worm in its given position.

6. The fish hook defined in and according to claim 5, and wherein the J-shaped terminal end portion embodies a tapering leg which has a free end portion directed toward and adapted to contact a surface of the shank portion, said leg being provided with a return bend which in conjunction with the leg constitutes a hook-like bill portion, certain surfaces of the leg and bill portion being flattened to achieve the step of positively locking the over-all eye in that portion of the worm in which it is embedded when in use.

* * * * *